United States Patent [19]

Murakami et al.

[11] Patent Number: 5,331,612
[45] Date of Patent: Jul. 19, 1994

[54] MAGNETO-OPTICAL RECORDING APPARATUS USING THE MAGNETIC FIELD MODULATION METHOD

[75] Inventors: Yoshiteru Murakami, Nishinomiya; Kenji Ohta, Kitakatsuragi; Akira Takahashi, Nara, all of Japan

[73] Assignee: Sharp Kabushiki Kaisha, Osaka, Japan

[21] Appl. No.: 922,854

[22] Filed: Jul. 31, 1992

[30] Foreign Application Priority Data

Aug. 2, 1991 [JP] Japan .................. 3-194344

[51] Int. Cl.$^5$ .................................. G11B 13/04
[52] U.S. Cl. ........................ 369/13; 369/116
[58] Field of Search ........... 369/13, 116, 14, 110; 360/59, 114; 365/122

[56] References Cited

U.S. PATENT DOCUMENTS

| | | | |
|---|---|---|---|
| 4,843,604 | 6/1989 | Fujiwara et al. | 369/13 |
| 4,984,816 | 1/1990 | Sukeda et al. | 369/116 |
| 5,175,721 | 12/1992 | Nakayama et al. | 369/13 |

FOREIGN PATENT DOCUMENTS

| | | |
|---|---|---|
| 0206824 | 12/1986 | European Pat. Off. . |
| 0243656 | 11/1987 | European Pat. Off. . |
| 0266833 | 5/1988 | European Pat. Off. . |
| 0315415 | 5/1989 | European Pat. Off. . |
| 0338827 | 10/1989 | European Pat. Off. . |

OTHER PUBLICATIONS

Patent Abstracts of Japan, Publication No. JP55139693; Publication Date Oct. 31, 1980.
"Magneto-Optical Recording with Optical Modulation and Magnetic Field Modulation" Reports of Japan Applied Magnetics Institute, vol. 15, No. 2, 1991 pp. 225-228 (translation of relevant passages enclosed).
"Magneto-Optical Recording with Optical and Magnetic Field Modulation Methods" Proceedings of Magneto-Optical Recording International Symposium '91, J. Magn. Soc. Jpn., vol. 15, Supplement No. S1 (1991), pp. 327-330).

Primary Examiner—Robert J. Pascal
Assistant Examiner—Tan Dinh
Attorney, Agent, or Firm—Robert F. O'Connell; Kevin J. Fournier; David G. Conlin

[57] ABSTRACT

A magneto-optical recording apparatus which records information through the processes of: first irradiating a light beam onto a magneto-optical recording medium having a recording film; and next applying an external magnetic field that is inverted in response to a recording signal onto the recording film while continuing the first process. In the above arrangement, the intensity of the light beam is dropped upon inversion of the external magnetic field so that information is not recorded. The intensity of the light beam is raised during non-inversion of the external magnetic field so that information is recorded. Further the magneto-optical recording apparatus is provided with a light intensity control device for varying the intensity of the light beam dependent of the lengths of recording bits so that the high-temperature area of the recording film is not widened. Since the width of the recording bits is uniformly maintained, the remaining of the recording bit after overwriting operation can be reduced; thus, the signal quality in reproduction can be enhanced.

8 Claims, 8 Drawing Sheets

MAGNETO-OPTICAL RECORDING APPARATUS USING THE MAGNETIC FIELD MODULATION METHOD

FIELD OF THE INVENTION

The present invention relates to a magneto-optical recording apparatus for recording information on a magneto-optical recording medium such as a magneto-optical disk, a magneto-optical card and a magneto-optical tape, by the use of the magnetic field modulation method.

BACKGROUND OF THE INVENTION

Recently, magneto-optical recording media such as magneto-optical disks and magneto-optical cards have been considered as prospective rewritable large-capacity optical memory.

Information is recorded on a magneto-optical recording medium by applying an external magnetic field onto a recording film made of a magnetic material while projecting a light beam thereonto so as to cause a temperature rise at the irradiated area. Furthermore, the information is reproduced by projecting a light beam onto the recording film and detecting the rotation direction of the polarization plane of the reflected light.

The magneto-optical recording is roughly classified into two methods: i) the light modulation method wherein recording is executed by modulating the intensity of a light beam in accordance with information while maintaining an external magnetic field in a constant intensity and in a fixed direction; ii) the magnetic field modulation method wherein recording is executed by inverting the direction of the external magnetic field in accordance with information while maintaining a light beam in a constant intensity.

In the light modulation method, wherein the direction of the external magnetic field is fixed, an erasing operation is necessary for aligning the magnetization in the reversed direction to the direction of the external magnetic field, prior to the recording operation.

On the other hand, in the magnetic field modulation method, since new information can be recorded while erasing previously recorded information, no erasing operation is necessary prior to recording operation; thus, so-called overwriting is possible. Since recording time is shortened by the use of this method, the study of magneto-optical recording apparatuses using the magnetic field modulation recording has been actively carried out in recent years.

In the magneto-optical recording apparatus using the magnetic field modulation recording, the external magnetic field is normally generated by an electromagnet that is composed of a coil wound around a cylindrical ferrite core. The electromagnet can easily invert the direction of a generated magnetic field by switching the polarity of the current to be supplied to the coil.

Here, in a practical operation, the direction of the external magnetic field is inverted not instantaneously, but in a finite time. That is, when the external magnetic field is inverted, the intensity of the magnetic field diminishes as time elapses, reaching zero at a certain point of time, and then increasing. Therefore, centered around the point of time at which the intensity of the external magnetic field becomes zero, there exists a period during which the intensity of the external magnetic field becomes weaker than that required for recording.

For this reason, the chief disadvantage of this conventional arrangement is that recording bits having nonuniform shapes are formed in a recording area on the recording film whereonto this weaker external magnetic field has been applied; this causes deterioration of the signal quality in reproduction.

In order to solve the above problem, there has been proposed a method for lowering the intensity of a light beam when the direction of the external magnetic field is switched (U.S. patent application Ser. No. 07/738,923). With this method, since the intensity of the light beam is lowered upon inversion of the recording magnetic field that causes a weaker magnetic field, the disadvantage of having recordings made by the weaker magnetic field can be eliminated.

However, in the case of overwriting operation by the use of the above method, that is, in the case of making new recordings over previously recorded information, the inversion of the magnetization does not occur at an area in a previously recorded bit that has not been subjected to a light beam having a sufficient light intensity for recording. Consequently, a problem arises in how much of the previously recorded information remains after an overwriting operation ( this rate, hereinafter, referred to as the erasing rate).

Referring to FIG. 9, the following description will discuss the problem of the erasing rate in detail.

FIG. 9 illustrates recording conditions of a shortest recording bit 51 and a longest recording bit 52 which are determined by the modulation method adopted. When an external magnetic field, indicated by FIG. 9 (b), is applied while keeping the intensity of a light beam at the same high-level "H" as indicated by FIG. 9 (a), the resulting longest recording bit 52 widens toward its end portion as indicated by FIG. 9(c) because the area being subjected to a temperature rise, due to the irradiation by the light beam, widens toward its end portion.

For this reason, as illustrated in FIG. 10, when a signal corresponding to the shortest recording bit is overwritten on the longest recording bit 52, only the information corresponding a portion of the longest recording bit, located within a width W, that is, the width of the shortest recording bit, is erased and previous recordings are left at areas outside the width W (indicated by hatching for convenience).

Moreover, in addition to the problem of the remaining of previously recorded information, another problem is presented in that, since the width of a recording bit increases with the increase of the lengths of the recording bit, crosstalk is increased in reproducing signals of the adjoining tracks; this also causes deterioration of the signal quality in reproduction.

SUMMARY OF THE INVENTION

It is an object of the present invention to provide a magneto-optical recording apparatus wherein the intensity of the light beam is varied dependent on the lengths of recording bits when information is recorded by the use of the magnetic field modulation method.

In order to achieve the above objective, the magneto-optical recording apparatus of the present invention, which is provided with means for irradiating a light beam onto a magneto-optical recording medium having a recording film whereon information is recorded; and means for applying an external magnetic field that is inverted in response to a recording signal onto the recording film that has been subjected to a temperature rise by the light beam. The magneto-optical recording apparatus is characterized by having light intensity control means for controlling the intensity of the light beam through the processes of: dropping the intensity of the light beam to a level that is insufficient for recording upon inversion of the external magnetic field; raising the intensity of the light beam to a level that is sufficient for recording during non-inversion of the external magnetic field; and during the latter process, in the case of successively applying the same magnetic field for more than a predetermined period, decreasing the intensity of the light beam in comparison with the case applying the magnetic field within the predetermined time such that the high-temperature area of the recording film is not widened.

In accordance with the above arrangement, a weak light beam is irradiated upon inversion of the external magnetic field so as not to record information, while a strong light beam is irradiated during non-inversion of the external magnetic field so as to record information. Further, in the case of having a long period of the non-inversion of the external magnetic field, that is, in the case of having a long period during which the same magnetic field is successively applied, the light intensity control means decreases the intensity of the light beam such that the high-temperature area of the recording film is not widened in comparison with the case of having a short period of the non-inversion of the external magnetic field; therefore, even if a weaker external magnetic field than the sufficient magnetic field for recording is applied, the disadvantage that recording bits having nonuniform shapes are formed can be eliminated. Moreover, independent of the length of the period during which the external magnetic head is not inverted, the width of recording bits can be uniformly maintained. Thus, the signal quality in reproduction can be enhanced.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 7 illustrate one embodiment of the present invention.

FIG. 1 is a schematic block diagram of a magnetooptical recording apparatus of the present invention.

FIG. 3 is one example of a circuit diagram including a pattern detection circuit and a laser intensity control circuit of FIG. 1.

FIG. 4 is another example of a circuit diagram including a pattern detection circuit and a laser intensity control circuit of FIG. 1.

FIG. 5 is a schematic partially sectional view showing a magneto-optical disk.

FIG. 6 is a graph indicating the temperature dependence of the Kerr rotation angle and the coercive force.

FIG. 7 is a graph indicating the duty-ratio dependence of the erasing rate.

FIG. 9(a) is a diagram of a waveform indicating the variation with time of the intensity of a light beam during recording.

FIG. 9(b) is a diagram of a waveform indicating the variation with time of an external magnetic field during recording.

FIG. 9(c) is an explanatory drawing indicating shapes of recording bits.

DETAILED DESCRIPTION OF THE PREFERRED EMBODIMENTS

Referring to FIGS. 1 through 8, the following description will discuss one embodiment of the present invention.

Figure 1:
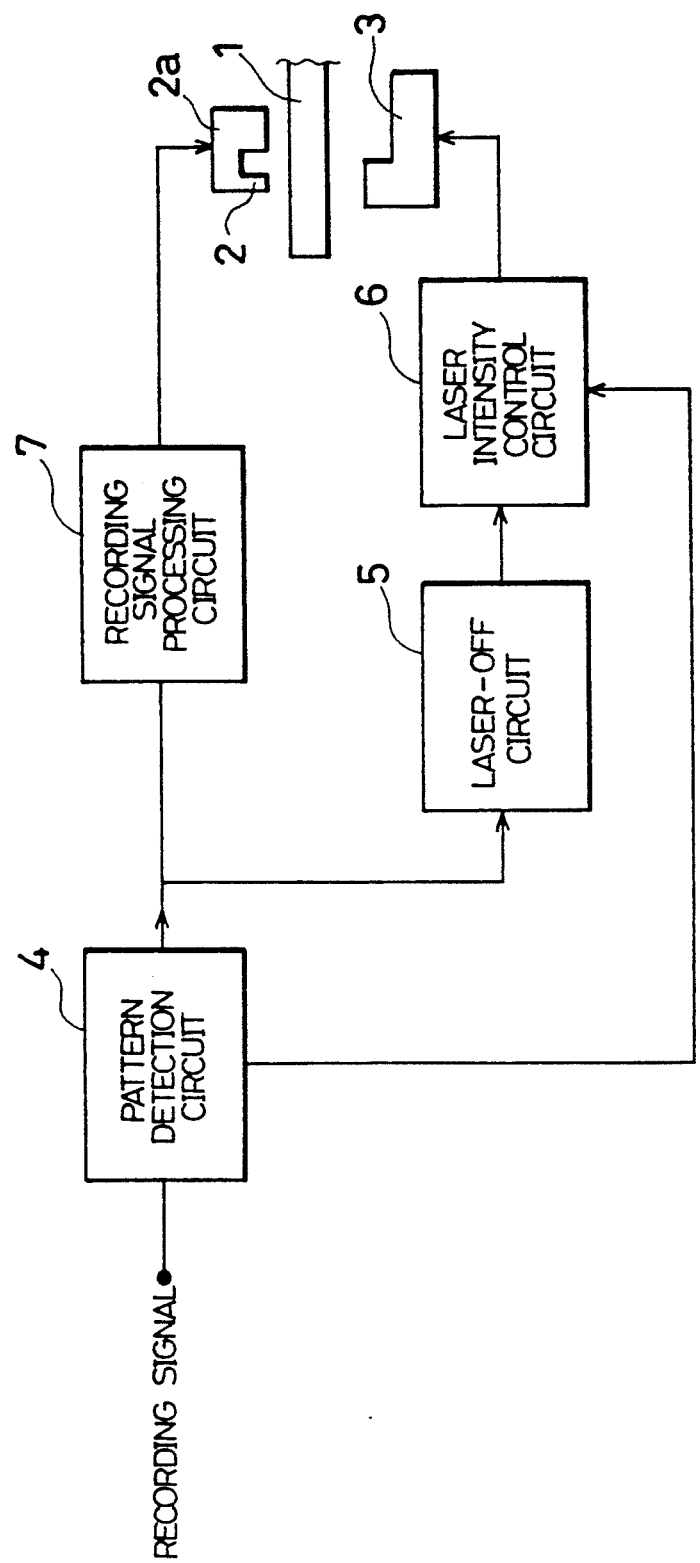

As illustrated in FIG. 1, a magneto-optical disk 1 as a magneto-optical recording medium is employed in a magneto-optical disk apparatus as a magneto-optical recording apparatus.

Figure 5:
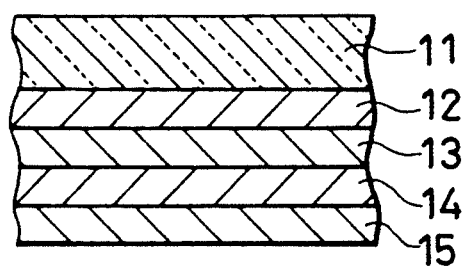

As illustrated in FIG. 5, the magneto-optical disk 1 has a configuration wherein a first dielectric film 12, a recording film 13 made of a magnetic material, a second dielectric film 14 and a reflective layer 15 are successively laminated on a disc-shaped transparent substrate 11.

In the magneto-optical disk apparatus shown in FIG. 1, a magnetic head 2 is disposed by the reflective film 15 side of the magneto-optical disk 1, as an external magnetic field applying means. The magnetic head 2 is integrally installed into a slider 2a that is capable of sliding over the magneto-optical disk 1. The slider 2a is depressed toward the magneto-optical disk 1 by a suspension (not shown). This depressing force balances a buoyant force caused by an air flow that is developed between the slider 2a and the magneto-optical disk 1 by the rotation of the magneto-optical disk 1. Thus, the magnetic head 2 is permitted to float above the magneto-optical disk 1 with a predetermined space therefrom.

On the other hand, an optical head 3 is disposed in the magneto-optical disk apparatus by the substrate 11 side of the magneto-optical disk 1. The optical head 3 is provided with a laser diode 3a as a light source which will be described later. A light beam projected from the laser diode 3a is converged by an objective lens (not shown) and directed onto the recording film 13 through the substrate 11.

A recording signal, which is obtained by modulating information to be recorded, is inputted to a pattern detection circuit 4. In the pattern detection circuit 4, a bit pattern of the recording signal is detected. Then, from the pattern detection circuit 4, a pattern detection signal for identifying the bit pattern is sent to a laser intensity control circuit 6 and a bit inversion detection signal is also sent to a recording signal processing circuit 7 and a laser-off circuit 5.

The recording signal processing circuit 7 supplies to the magnetic head 2 a driving current whose polarity is inverted in response to the bit inversion detection signal. The magnetic head 2 thus applies to the recording film 13 an external magnetic field which is inverted in response to the recording signal.

Upon receiving the bit inversion detection signal, the laser-off circuit 5 sends to the laser intensity control circuit 6 a laser-off signal for lowering the intensity of the light beam so that the magnetization of the recording film 13 is not affected by the external magnetic field for a period that is required for the inversion of the external magnetic field.

The laser intensity control circuit 6 controls the intensity of the light beam so that the width of the recording bit is kept constant according to the pattern detection signal that has been inputted from the pattern detection circuit 4. Also, while the laser-off signal is being inputted thereto from the laser-off circuit 5, the laser intensity control circuit 6 controls the intensity of the light beam so that it becomes equal to an appropriate intensity of the light beam (hereinafter referred to as a reading intensity) which is irradiated for obtaining a reproduced signal in reproduction. The pattern detection circuit 4, the laser-off circuit 5 and the laser intensity control circuit 6 constitute a light intensity control means.

In the above arrangement, the following description will discuss a recording operation wherein information to be recorded is modulated by using the 2-7NRZI code.

In the modulation by using the 2-7NRZI code, information is recorded by the use of six types of recording bits having different lengths. Assuming that the data bit cycle of information is T, the length of a recording bit corresponds to one of those lengths 1.5T, 2T, 2.5T, 3T, 3.5T and 4T.

Figures 2A, 2B:
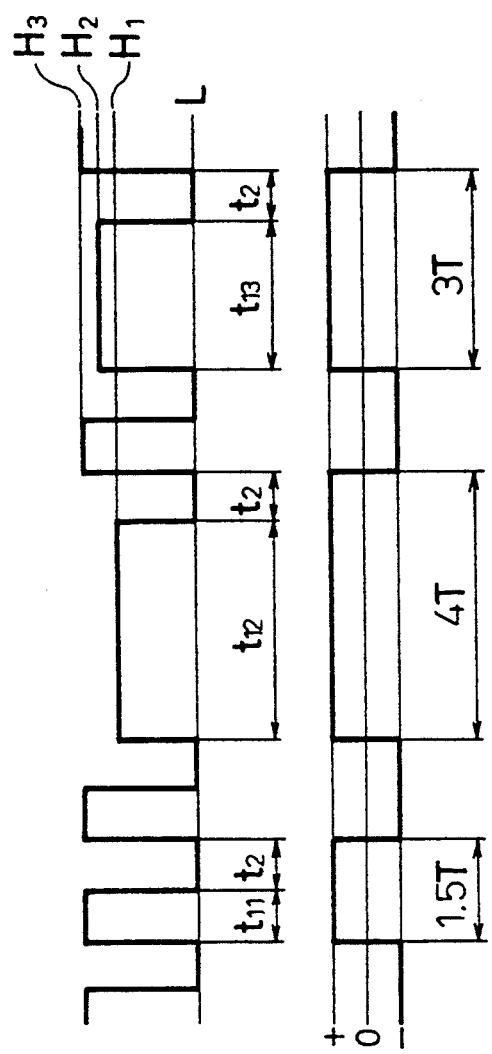
FIG. 2(a) is a diagram of a waveform indicating the variation with time of the intensity of a light beam during recording.
FIG. 2(b) is a diagram of a waveform indicating the variation with time of an external magnetic field during recording.

FIG. 2 illustrates the variation with time of the intensity of a light beam (FIG. 2(a)) in the case of recording a 1.5T signal corresponding to the shortest recording bit length, a 3T signal corresponding to the intermediate recording bit length and a 4T signal corresponding to the longest recording bit length among six types of the recording bit lengths. Further, FIG. 2 illustrates the variation with time of an external magnetic field (FIG. 2(b)) with respect to its magnetic field intensity and magnetic field direction, in the case of recording the respective three signals.

The external magnetic field is inverted in response to the recording signal. In FIG. 2, for convenience, the variation with time of the external magnetic field is expressed by rectangular waveforms; however, in fact, a finite rising time and a finite falling time are required in each of the inversion areas.

The intensity of the light beam to be irradiated for recording is varied dependent on the recording bit lengths. That is, the highest light intensity, which is hereinafter referred to as high-level H3, is employed in response to the 1.5T signal corresponding to the shortest recording bit length (a signal whose non-inversion period of the external magnetic field is short). Further, the lowest light intensity, which is hereinafter referred to as high-level $H_1$, is employed in response to the 4T signal corresponding to the longest recording bit length (a signal whose non-inversion period of the external magnetic field is long). Also, the high-level $H_2$, having the intermediate light intensity between the high-levels $H_1$ and $H_3$, is employed in response to the 3T signal corresponding to the intermediate recording bit length (a signal whose non-inversion period of the external magnetic field is intermediate).

Furthermore, the intensity of the light beam is controlled to become a low-level L immediately before the inversion of the external magnetic field so that recording is not executed during the inversion period of the external magnetic field. Here, if the value of the low-level L is set to zero, focusing control and tracking control are not performed; therefore, the focusing servo and the tracking servo might be out of control. For this reason, in this embodiment, the value of the low-level L is set to the reading intensity, that is, the intensity of the light beam in reproduction.

Additionally, in FIG. 2, phases of the light beam and the external magnetic field are illustrated as being coincident to each other for convenience of explanation; however, in an actual recording process, deviations with time are raised during heating and cooling-off processes of the recording film 13. Therefore, the phases of the light beam and the external magnetic field should be properly set so as to obtain optimal recording. Further, designating that a period required for raising the intensity of the light beam to the high-levels $H_1$–$H_3$, that is, the recordable levels, is $t_1$ (varying dependent on the length of recording bits), and that a period required for lowering the intensity of the light beam to the low-level L is $t_2$, the duty ratio represented by $t_1/(t_1+t_2)$ should be properly set to obtain optimal recording. Here, the setting of the duty ratio is performed by selecting the value of $t_2$.

The length of recording bits is determined by the interval between the inversions of the external magnetic field; therefore, information is modulated by using the predetermined modulation method, and according to a recording signal thus obtained (that is, the length of a recording pattern ), the external magnetic field is inverted. In response to this operation, the intensity of the light beam is switched to the high-level $H_1$–$H_3$ or the low-level L. In this case, $t_2$ need not be varied according to the length of the recording bit, and is always kept constant.

Figure 3:
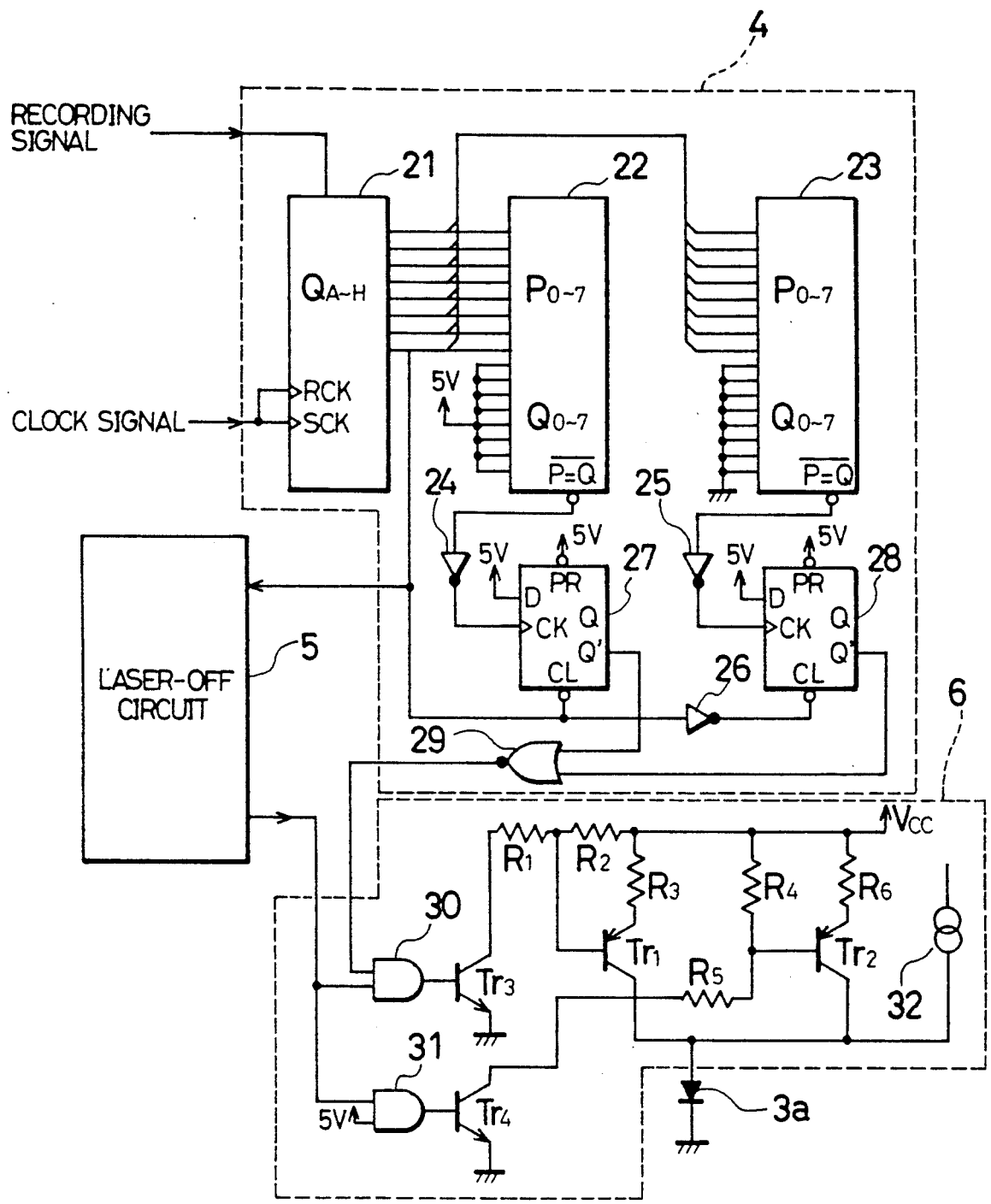

Referring to FIG. 3, the following description will discuss one example of a circuit including a pattern detection circuit 4 and a laser intensity control circuit 6.

The pattern detection circuit 4 is constituted by the following components: a shift register 21 for converting serial data as a recording signal into parallel data of 8 bits; a comparator 22 of 8 bits for detecting whether or not the parallel data of 8 bits, which have been released from the shift register 21, is $FF ( binary number: 11111111); a comparator 23 of 8 bits for detecting whether or not the parallel data of 8 bits, which have been released from the shift register 21, is $00(binary number: 00000000); inverters 24 through 26; flipflops 27 and 28; and NOR gate 29.

Here, for example, the SN74LS594 manufactured by Texas Instruments Inc. (hereinafter, referred to as TI Inc. ) may be employed as the shift register 21. Further, as the comparators 22 and 23, the SN74LS688 of TI Inc. may be employed; and as the flipflops 27 and 28, the SN74AS74 of the same may be employed.

The recording signal inputted to the shift register 21 is selectively used in synchronism with a clock signal that is inputted thereto through clock terminals RCK and SCK, and converted into the parallel data of 8 bits, and then sent to input terminals $P_0$-$P_7$ of the comparators 22 and 23 through the output terminals $Q_A$-$Q_H$.

Input terminals Q0 - Q7 of the comparator 22 are set to a high-level (5V); thus, only upon receiving the data of $FF at the input terminals $P_0$-$P_T$, a signal having a low-level is released to the inverter 24. The output of the inverter 24 is inputted to the clock terminal CK of the flipflop 27. The data terminal D and the preset terminal PR of the flipflop 27 are set to a high-level and the output terminal Q is opened. The output terminal $Q_H$ of the shift register 21 is connected to the clear terminal CL of the flipflop 27; thus, when the output of the inverter 24 is high, the inversion output terminal Q' of the flipflop 27 releases a signal having a low-level.

On the other hand, input terminals $Q_0$- $Q_7$ of the comparator 23 are set to a low-level (0V); thus, only upon receiving the data of $00 at the input terminals $P_0$- $P_7$, a signal having a low-level is released to the inverter 25. The output of the inverter 25 is inputted to the clock terminal CK of the flipflop-28. The data terminal D and the preset terminal PR of the flipflop 28 are set to a high-level and the output terminal Q is opened. The output terminal QH of the shift register 21 is connected to the clear terminal CL of the flipflop 28 through the inverter 26; thus, when the output of the inverter 25 is high, the inversion output terminal Q' of the flipflop 28 releases a signal having a low-level.

The inversion output terminals Q' of the flipflops 27 and 28 are respectively connected to input terminals of the NOR gate 29; the output of this NOR gate 29 is sent to the laser intensity control circuit 6 as a pattern detection signal. Thus, the pattern detection circuit 4 releases the pattern detection signal having a low-level upon detecting a bit pattern having successive eight "0"s or "1"s in the recording signal.

Moreover, the output terminal QH of the shift register 21 is connected to input terminals (not shown in FIG. 3) of the laser-off circuit 5 and the recording signal processing circuit 7; thus, the recording signal is sent to the laser-off circuit 5 and the recording signal processing circuit 7 with a predetermined time interval.

The laser intensity control circuit 6 is constituted by the following components: transistors $Tr_1$ and $Tr_2$ and a constant current source 32 for controlling a driving current to be supplied to a laser diode $3a$ that is provided in the optical head 3; AND gates 30 and 31 and transistors $Tr_3$ and $Tr_4$ for controlling the transistors $Tr_1$ and $Tr_3$; and resistors $R_1$ through $R_6$.

Here, for example, the SN55452B of TI Inc. may be employed as the AND gates 30 and 31.

The pattern detection signal, released from the NOR gate 29 of the pattern detection circuit 4, and the laser-off signal, released from the laser-off circuit 5, are inputted to the AND gate 30. Therefore, when the bit pattern having successive eight "0"s or "1"s is detected in the recording signal or when the external magnetic field is inverted, the output of the AND gate 30 becomes low, whereby the transistor $Tr_3$ is turned off. Consequently, the transistor $Tr_1$ is also turned off.

On the other hand, the laser-off signal from the laser-off circuit 5 is inputted to the AND gate 31 through one input terminal thereof and the other input terminal is set to the high-level. Therefore, when the external magnetic field is inverted, the output of the AND gate 31 becomes low, whereby the transistor $Tr_4$ is turned off. Consequently, the transistor $Tr_2$ is also turned off.

With the above arrangement, since the two transistors $Tr_1$ and $Tr_2$ are turned off when the external magnetic field is inverted, the driving current of the laser diode $3a$ is supplied only from the constant current source 32. The driving current, which is supplied by the constant current source 32, is set to allow the light beam to have the reading intensity; therefore, in this case the intensity of the light beam becomes the low-level L.

During non-inversion of the external magnetic field, the transistor $Tr_2$ is kept on. Further, the transistor $Tr_1$ is turned on and off in response to the pattern detection signal. More specifically, when the pattern detection circuit 4 detects the bit pattern having successive eight "0"s or "1"s in the recording signal, the transistor $TR_1$ is turned off; thus, the driving current of the laser diode $3a$, constituted of the current supplied by the constant current source 32, is now added by a collector current of the transistor $Tr_2$ that is derived from a voltage Vcc. Accordingly, the intensity of the light beam becomes the high-level $H_1$. On the other hand, when the pattern detection circuit 4 does not detect the above bit pattern in the recording signal, the transistor $Tr_1$ is kept on; thus, the driving current of the laser diode $3a$ is constituted of collector currents from the transistors $Tr_1$ and $Tr_2$ in addition to the current supplied from the constant current source 32. Accordingly, the intensity of the light beam is in the high-level $H_3$ (or the high-level $H_2$).

In the above-mentioned embodiment, an explanation was given of the circuit for controlling the intensity of the light beam so as to be the one low-level L and the two high-levels $H_3$ (or $H_1$) and $H_1$. In the next embodiment, an explanation will be given of a circuit which controls the intensity of the light beam by the use of one low-level L and a plurality of high-levels $H_1$ through $H_N$, the number of which is given by N.

Figure 4:
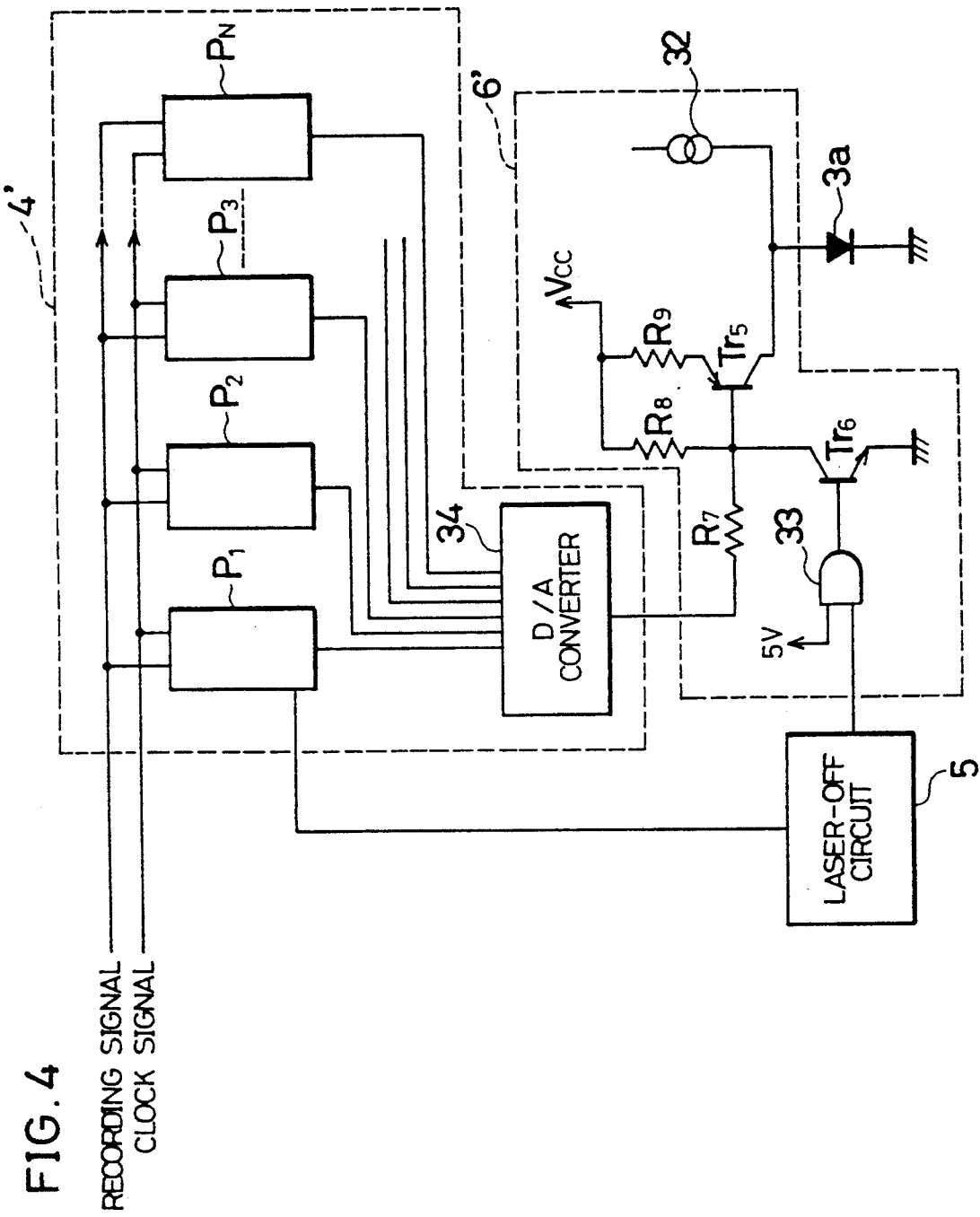

As shown in FIG. 4, a pattern detection circuit 4' is constituted by a plurality of pattern detection circuits $P_1$ through $P_N$ whose number is given by N and a D/A converter 34 of N bits. Each of these pattern detection circuits $P_1$ through $P_N$ has virtually the same configuration as the pattern detection circuit 4 of FIG. 3; and input terminals $Q_0$- $Q_7$ of each comparator 22 are set to a low-level or a high-level dependent on respective bit patterns so as to detect the prescribed bit patterns.

Pattern detection signals, detected by the pattern detection circuits $P_1$ through PN, are inputted to the D/A converter 34, and converted into voltages corresponding to respective bit patterns.

The laser intensity control circuit 6' is constituted by the following components: a transistor $Tr_5$ and a constant current source 32 for controlling a driving current to be supplied to a laser diode $3a$; an AND gate 33 and transistor $Tr_6$ for controlling the transistor $Tr_5$; and resistors $R_7$ through $R_9$.

The laser-off signal from the laser-off circuit 5 is inputted to the AND gate 33 through one input terminal thereof and the other input terminal is set to the high-level. Therefore, when the external magnetic field is inverted, the output of the AND gate 33 becomes low; thereby the transistor $Tr_6$ is turned off. Here, the transistor $Tr_5$ is also turned off; thus, the driving current of the laser diode $3a$ is supplied only from the constant current source 32. The driving current, which is supplied by the constant current source 32, is set to allow the light beam to have the reading intensity; therefore, in this case the intensity of the light beam becomes the low-level L.

On the other hand, during non-inversion of the external magnetic field, the transistor $Tr_6$ is kept on. Further, the collector current of the transistor $Tr_5$ is controlled by the output voltages of the D/A convertor 34 corresponding to the bit patterns. Thus, the driving current of the laser diode $3a$, constituted of the current supplied from the constant current source 32, is now added by the collector current of the transistor $Tr_5$ that is derived from a voltage Vcc. Accordingly, the intensity of the light beam is set to one of the high-levels $H_1$ through $H_N$.

In a magneto-optical disk apparatus having the above arrangement, the overwriting operation was conducted using the following magneto-optical disk 1 and the erasing rate was measured.

A plate of polycarbonate that measured 86 mm in outside diameter, 15 mm in inside diameter, and 1.5 mm in thickness was used as the substrate 11 of the magneto-optical disk 1. A1N films that respectively measured 80 run and 25 run in thickness were used as the first dielectric film 12 and the second dielectric film 14. Further, a DyFeCo film measured 20 nm in thickness was used as the recording film 13 while an A1 film measured 30 nm was used as the reflective film 15.

The composition of the above DyFeCo film is represented by $Dy_x(Fe_yCo(1-y))(1-x)$. Here, in this embodiment, y is fixedly set to 0.78. Then, a magneto-optical disk 1a having a DyFeCo film with x set to 0.212 is prepared. Further, magneto-optical disks 1b and 1c having two types of DyFeCo films with x respectively set to 0.225 and 0.237 are prepared so as to obtain examples for comparison, which will be described later. The Curie temperatures of the respective DyFeCo films are 220° C. 210° C. and 205° C. For the DyFeCo film having x of 0.225, its magnetic compensation temperature is equal to room temperature.

Figure 6:
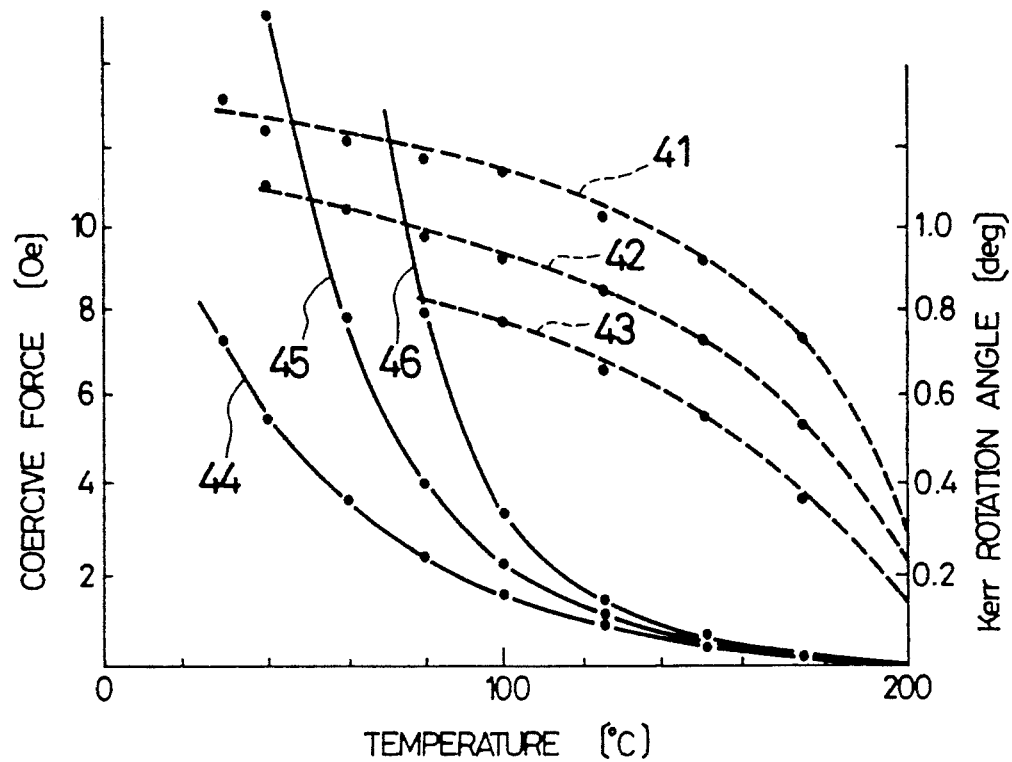

FIG. 6 shows curves 41 through 43 that indicate the temperature dependence of the Kerr rotation angle of these DyFeCo films as well as curves 44 through 46 that indicate the temperature dependence of the coercive force thereof.

The optical head 3 employed in those measurements was provided with a laser diode 3a which projected a light beam having the wavelength of 780 nm as a light source, and an objective lens having NA (Numerical Aperture) of 0.55. On the other hand, the magnetic intensity of the external magnetic field was set to 160 Oe. Time required for inversion of the external magnetic field, that is, magnetic field switching time was 20-30 ns. Here, the magneto-optical disk 1 was rotatively driven so that its linear velocity was 10 m/s.

After having recorded a 4T signal obtained by the 2-7 NRZI modulation method along one track of the magneto-optical disk 1, a 1.5T signal was overwritten on the recording bit. Thus, the erasing rate was defined as a difference between the carrier levels of the 4T signals as reproduced signals obtained before and after the overwriting operation. The carrier level of the 4T signals was measured by a spectrum analyzer.

In those measurements, the recording frequency corresponding to the 4T signal was set to 2.1 MHz and that corresponding to the 1.5T signal was set to 5.6 MHz; thus, the lengths of the recording bits corresponding to the 4T signal and the 1.5T signal were virtually 2.4 $\mu$m and 0.9 $\mu$m respectively under the linear velocity of 10 m/s.

Figure 7:
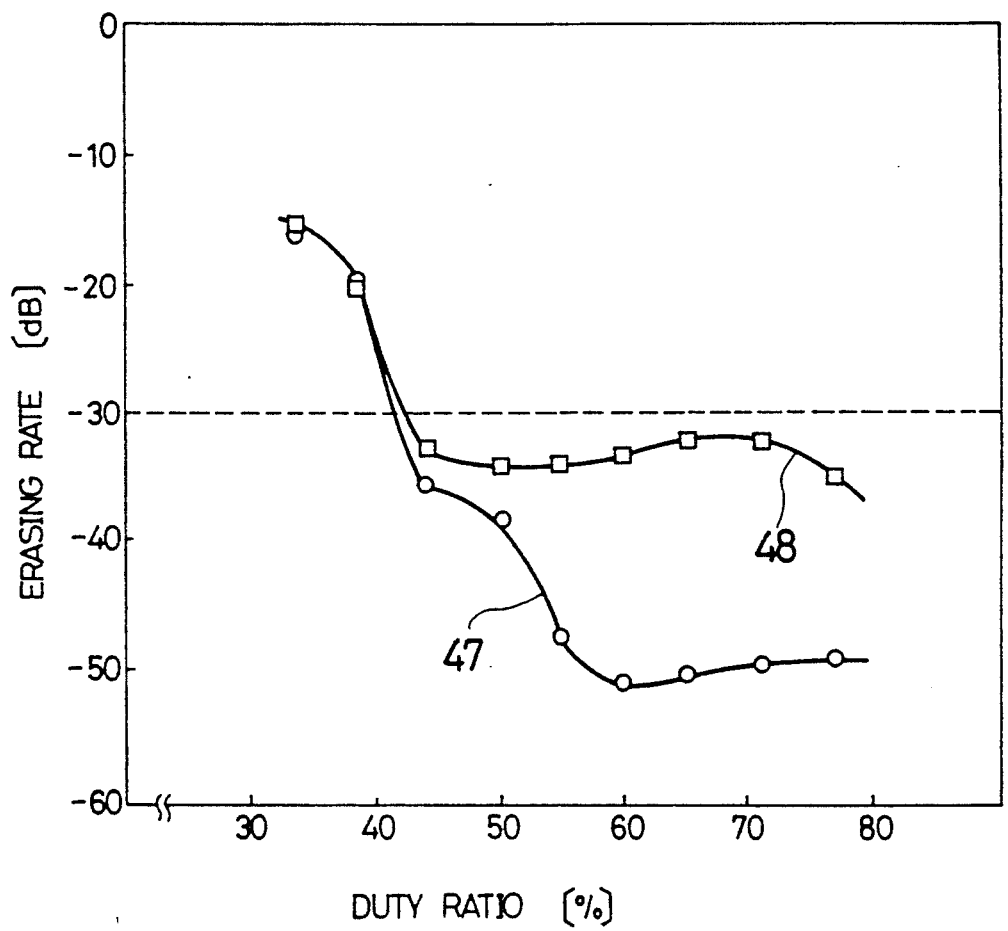

FIG. 7 shows the duty ratio dependence of the erasing rate actually measured.

Figure 8:
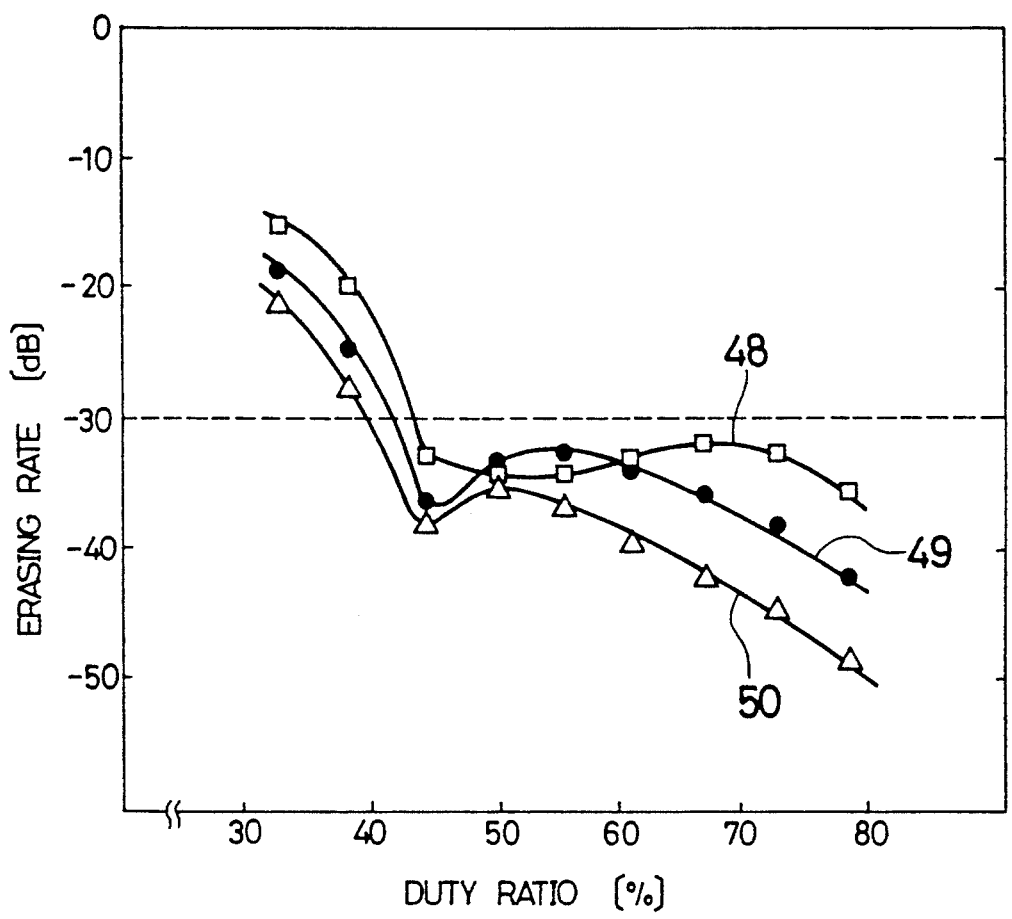
FIG. 8 is a graph indicating the duty-ratio dependence of the erasing rate.
Figures 9, 10:
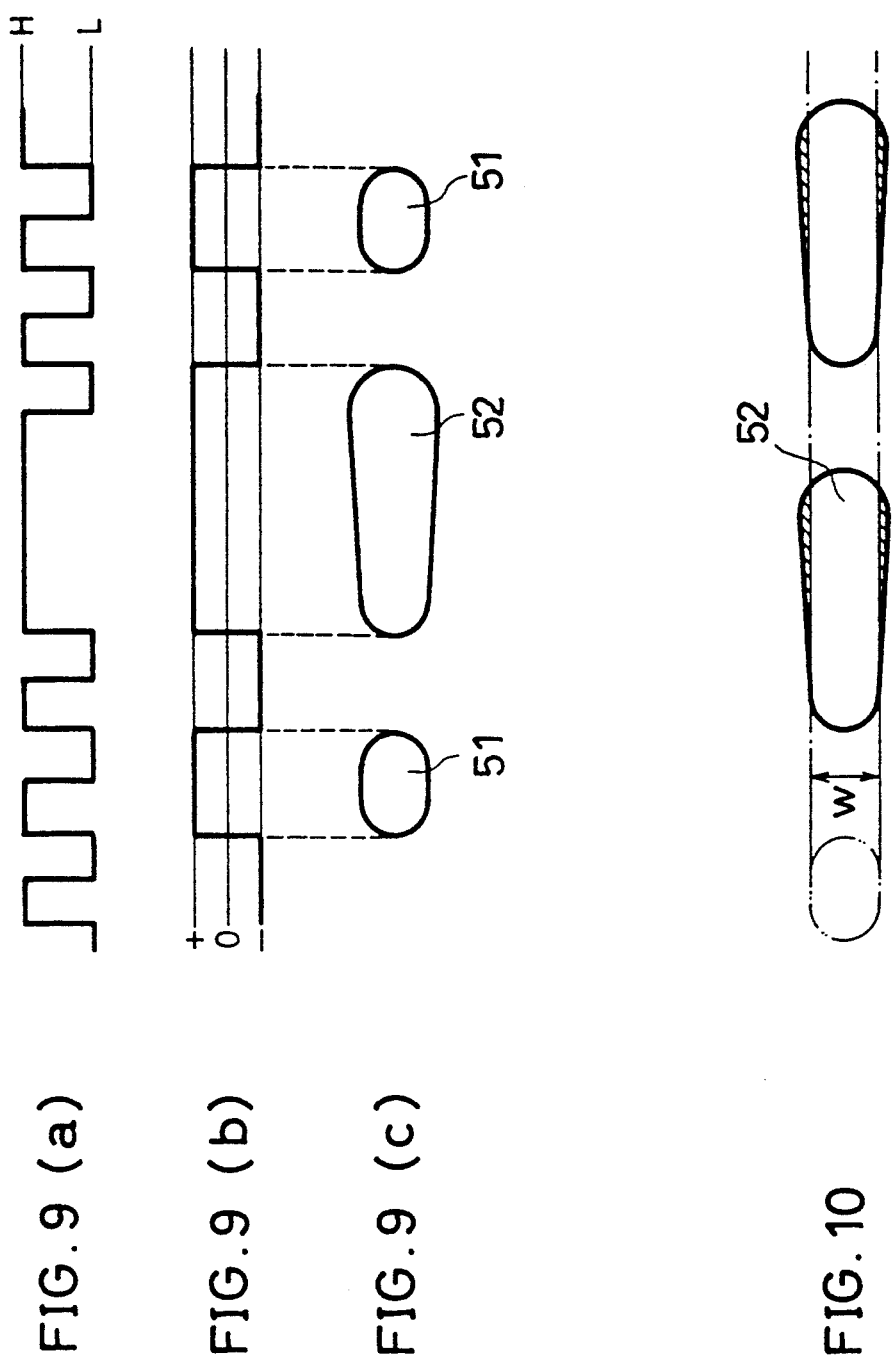
FIG. 10 is an explanatory drawing indicating the remaining of a recording bit after overwriting operation.

Further, for comparison, FIG. 8 shows the duty-ratio dependence of the erasing rate that was obtained when overwriting operations were conducted under the following conditions: The magneto-optical disks 1a, 1b and 1c were used; the intensity of the light beam was lowered to the low-level L upon inversion of the external magnetic field; the intensity of the light beam was kept at the same high-level H during other periods except the inversion period. Here, the high-level H was set to 8 mW at which the highest C/N ratio had been obtained in the evaluation (C/N evaluation) of the reproduced signal quality through another experiment. As described earlier, the duty ratio in the horizontal axis of FIG. 8 is represented by $t_1/(t_1+t_2)$ where $t_1$ (the period during which the intensity of the light beam is kept at the high-level H) is for use in recording the 1.5T signal.

The curve 47 of FIG. 7 was obtained when overwriting operations were conducted under the following conditions: The magneto-optical disk 1a was used; the intensity of the light beam was lowered to the low-level L upon inversion of the external magnetic field; the intensity of the light beam was kept at the high-level $H_1$ for a 4T signal, while it is kept at the high-level $H_3$ which is higher than the high-level $H_1$ for a 1.5T signal, during other period except the inversion period.

Here, the high-level H x was set to 6 mW and the high-level $H_3$ was set to 8 mW. Consequently, it is noted that the C/N ratio is virtually the same 56 dB whether 8 mW is used or 6 mW is used for recording the 4T signal.

On the other hand, curves 48 through 50 in FIG. 8 respectively indicate erasing rates that were obtained by the use of the magneto-optical disk 1a through 1c. It is known from these graphs that any of these magneto-optical disks 1a through 1c can ensure the erasing rate of −30 dB that is required for practical application as long as their duty ratio is virtually not less than 44%. However, when taking account of the stability or other factors after having been subjected to repeated overwriting operations of more than several hundreds of thousands, this erasing rate is not sufficient.

FIG. 7 shows that the erasing rate of the curve 47 is virtually −50 dB with the duty ratio of not less than 55%; this indicates that there is hardly any previous recordings remaining after the erasing operation, taking account of the fact that the C/N radio of the 4T signal before the overwriting operation is virtually 56 dB.

Accordingly, in the case of conducting the overwriting operation with the intensity of the light beam being kept at the high-level $H_1$ for a 4T signal while being kept at the high-level $H_3$, higher than the high-level for a 1.5T signal, since the width of a long recording bit at its end portion is kept substantially the same as the width of a short recording bit, the erasing rate can be greatly improved.

Furthermore, since the increase of the width of a recording bit can be prevented, crosstalk from the adjoining tracks is reduced during reproduction, thus improving the reproducing, recording and erasing characteristics of the magneto-optical disk 1.

In the case of recording, for example, a 3T signal in addition to the 1.5T and 4T signals, the intensity of the light beam may be set to the high-level $H_2$ for the 3T signal, which is lower than the high-level H3 but higher than the high-level $H_1$. More specifically, if the high-level $H_1$ is 6 mW and the high-level $H_3$ is 8 mW, as described above, the high-level $H_2$ is set to around 7 mW.

In the above embodiments, explanations were given of the magneto-optical disk apparatus using the magneto-optical disk 1; yet, the present invention may be adopted in an magneto-optical card apparatus using magneto-optical cards or a magneto-optical tape apparatus using magneto-optical tapes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording apparatus, which is provided with means for irradiating a light beam onto a magneto-optical recording medium having a recording film, made of a magnetic material, whereon information is recorded and means for applying an external magnetic field that is inverted in response to a recording signal onto the recording film that has been subjected to a temperature rise by the light beam, comprising:

light intensity control means for controlling the intensity of the light beam such that, during recording, a light beam with a first light intensity is irradiated upon inversion of the external magnetic field and a light beam with a second light intensity is irradiated during non-inversion of the external magnetic field, the first light intensity, which is not sufficient for recording information, being lower than the second light intensity, the second intensity being sufficient for recording information, wherein the control means, during recording, further controls the second light intensity according to the lengths in a track direction of recording bits so that the second light intensity corresponding to longer recording bits is lower than the second light intensity corresponding to shorter recording bits.

2. The magneto-optical recording apparatus as set forth in claim 1, wherein the intensity of a light beam to be irradiated onto the magneto-optical recording medium for reproducing information is the same as said first light intensity.

3. The magneto-optical recording apparatus as set forth in claim 1, wherein the light intensity control means comprises:

pattern detection means for releasing a pattern detection signal which detects a bit pattern of a recording signal inputted thereto and identifies the bit pattern, and a bit inversion detection signal which detects a position in the recording signal at which an inversion of the external magnetic field takes place;

a laser-off circuit for releasing a laser-off signal for decreasing the intensity of the light beam from the light beam irradiation means in response to the bit inversion detection signal that has been inputted thereto from the pattern detection means; and laser intensity control means for controlling the intensity of the light beam to a level corresponding to a length of a recording bit according to the pattern detection signal that has been inputted thereto from the pattern detection circuit as well as for controlling the intensity of the light beam to a level corresponding to the first light intensity according to the laser-off signal that has been inputted thereto from the laser-off circuit.

4. The magneto-optical recording apparatus as set forth in claim 3, wherein the pattern detection means includes at least one pattern detection circuit comprising a comparator which has an input terminal whose level is set dependent on a predetermined bit pattern.

5. The magneto-optical recording apparatus as set forth in claim 3, wherein the laser intensity control means comprises:

a constant current source for supplying a driving current to the light beam irradiation means, the driving current being adapted to allow the light intensity to form the first light intensity upon inversion of the magnetic field; and a laser diode for adding a current corresponding to the pattern detection signal to the driving current from the constant current source during non-inversion of the magnetic field to provide a higher current for supply to the light beam irradiation means.

6. The magneto-optical recording apparatus as set forth in claim 1, wherein the magnetic field applying means comprises a magnetic head for applying to the magneto-optical recording medium a magnetic field in either of two directions opposite to each other.

7. The magneto-optical recording apparatus as set forth in claim 1, wherein the magneto-optical recording medium is selected from the group consisting of a magneto-optical disk, a magneto-optical tape and a magneto-optical card.

8. A method for overwriting information on a recording film having previously recorded information in a magneto-optical recording apparatus, which apparatus is provided with means for irradiating a light beam onto a magneto-optical recording medium having the recording film and means for applying an external magnetic field that is inverted in response to a recording signal onto the recording film that has been subjected to a temperature rise by the light beam, comprising the steps of:

inverting the external magnetic field in response to the recording signal;

reducing the intensity of the light beam to a level that is insufficient for recording upon inversion of the external magnetic field;

irradiating the recording film with a light beam whose intensity is sufficient for recording; and controlling the light beam to have a light intensity corresponding to a period to time during which the inverted external magnetic field is successively applied.

* * * * *